United States Patent [19]
Kesselman

[11] Patent Number: 5,228,250
[45] Date of Patent: Jul. 20, 1993

[54] TAMPER PROOF ANCHOR BOLT ASSEMBLY

[76] Inventor: David A. Kesselman, 5495 Winter Creek Rd., Santa Rosa, Calif. 95404

[21] Appl. No.: 923,506

[22] Filed: Aug. 3, 1992

[51] Int. Cl.$^5$ ............................................. E04B 1/00
[52] U.S. Cl. ........................................ 52/98; 52/698; 411/373
[58] Field of Search ............. 52/98, 698, 295; 411/1, 411/5, 2, 3, 4, 910, 373, 43, 39, 40, 911

[56] References Cited

U.S. PATENT DOCUMENTS

| | | |
|---|---|---|
| 3,027,796 | 4/1962 | Shewmon . |
| 3,333,439 | 8/1967 | Bessette . |
| 3,519,979 | 7/1970 | Bodenstein . |
| 3,978,761 | 9/1976 | Sosinski . |
| 4,037,515 | 7/1977 | Kesselman . |
| 4,122,753 | 10/1978 | Kuhlmann et al. . |
| 4,137,816 | 2/1979 | Gartner . |
| 4,167,886 | 9/1979 | Seghezzi et al. . |
| 4,225,165 | 9/1980 | Kesselman . |
| 4,295,761 | 10/1981 | Hansen . |
| 4,502,825 | 3/1985 | Yamada . |
| 4,504,180 | 3/1985 | Ishii et al. . |
| 4,595,315 | 6/1986 | Gallagher . |
| 4,618,299 | 10/1986 | Bainbridge et al. . |
| 4,897,008 | 1/1990 | Parks . |

FOREIGN PATENT DOCUMENTS

| | | |
|---|---|---|
| 2658996 | 6/1978 | Fed. Rep. of Germany . |
| 3738409 | 5/1989 | Fed. Rep. of Germany . |
| 2067699 | 7/1981 | United Kingdom . |
| 2095356 | 9/1982 | United Kingdom . |
| 2210124 | 1/1989 | United Kingdom . |

Primary Examiner—Carl D. Friedman
Assistant Examiner—Creighton Smith
Attorney, Agent, or Firm—Sixbey, Friedman, Leedom & Ferguson

[57] ABSTRACT

The tamper proof anchor bolt assembly includes a frangible nut assembly and a tamper resistant skirt attached to one end of an expandable anchor bolt device. An expandable anchoring means attached to the other end of the anchoring device expands to create a secure connection between the anchor bolt and a supporting structure in response to the application of torque to the frangible nut assembly. The frangible nut assembly includes a frangible connection which ruptures at a predetermined torque corresponding to the secure connection. The tamper resistant skirt is rotatably positioned around the entire periphery of the remaining frangible nut assembly to prevent a tool from upsetting the secure connection by applying a gripping force to the anchor bolt device.

17 Claims, 4 Drawing Sheets

TAMPER PROOF ANCHOR BOLT ASSEMBLY

BACKGROUND OF THE INVENTION

Anchor bolt assemblies have been widely used for many decades in both the construction field for securing a support structure to a wall and in the mining field to achieve strengthening of a rock structure. The most commonly used anchor bolt assembly uses an expandable portion attached to a threaded stud or bolt which is placed in a bore hole formed in a wall or other hard receiving material, such as rock, concrete and the like. The anchoring operation is effected by applying a torque to a working part on the end of the stud or bolt extending from the hard receiving material so as to cause rotation of the stud or bolt and radial widening of the expandable portion into engagement with the hard receiving material. Two commonly used expandable anchor bolt assemblies include expansion dowels having an expansion sleeve and wedging portion for expanding the sleeve, and anchor bolts having a plurality of expandable segments.

A second more recent type of anchor bolt assembly uses an adhesive or grouting material within the bore hole for securing the stud or bolt in place. When the resin or grouting material has sufficiently hardened, the working part on the outer end of the bolt or stud is rotated to torque an anchoring section embedded in the grouting material.

In either the expansion anchor bolt assembly or the adhesive type anchor bolt assembly, a secure connection between the anchor bolt assembly and the hard receiving material is obviously essential to the initial and continued proper functioning of the anchor bolt assembly. In either case, a secure connection is achieved by the application of a preset torque to assure that sufficient anchoring contact with the hard receiving material is attained. In the case of the expansion anchor assembly, there is a direct relation between the torque applied to the working portion of the stud or bolt and the radial expansion of the expansion portion so that the application of a preset torque is required to assure that sufficient anchoring is provided with the materials in which the anchor bolt is set. In the case of the adhesive type anchor bolt, there is a direct relation between the proper setting of the resin and the torque applied.

A preset torque can be applied to the working part of the stud by means of a torque wrench. Such wrenches, however, are expensive and sensitive to damage. Accordingly, it has also been known to provide a second working part connected to the first working part on the stud by a shear device rated to break when a preset torque is attained. Known shear devices interconnecting the two working parts include shear pins, shear rings, or interconnections such as spot welding and the like. Each of the working parts is provided with surfaces on which a tool can be placed for applying torque to the stud. In many cases, the working surfaces are in the form of a multisided member, such as a bolthead.

Once a preset torque has been applied to the anchor bolt so that the second working part has broken away from the first working part, a secure connection between the stud and the hard receiving material is created. If, however, torque is applied directly to the first working part mounted on the stud, whether it is for detaching or further tightening of the anchor bolt assembly, it leads to a departure from the preset torque and, therefore, a change in the preset anchoring values. Even though a minor detachment takes place, it is possible that the expansion portion under load will not be able to expand again or, if additional torque is applied, the bore hole into which the sleeve is inserted may be destroyed by exceeding its breaking point with a consequent drop in the anchoring values of the bolt assembly.

Accordingly, the optimum anchoring characteristics of the bolt assembly can only be insured if, after the flangible shear device breaks upon attainment of a preset torque, no further torque is transmitted through the first working part to the stud. Until the present time, it has been known to provide a device for indicating whether a tool has been used on the first working part of the stud for applying torque above the preset value. U.S. Pat. No. 4,167,886 issued to Seghezzi et al discloses an expansion dowel assembly having an indicating device which prevents an application of torque to the stud until at least portions of the indicating device or separating member have been removed. The separating member is in the form of an annular flange with spaced fingers positioned along, and in contact with, at least one side of the first working part to prevent the effective placement of a torque applying tool on the first working part. Accordingly, torque can be applied to the first working part only after the removal of a portion of the separating device and removal of such position is easily visually recognized so that it is simple to determine whether any further torque has been applied after the second working part has been removed from its position enclosing the first working part. Therefore, it can be assumed that any break in the flange represents a removal of one of the fingers and affords an indication that additional torque has been applied.

Although the indicating device disclosed in Seghezzi et al provides a means of visually determining whether an anchor bolt assembly has been tampered with, such a device does not permanently prevent the application of additional torque to the first working part. A passerby can impair the secure connection of the anchor bolt assembly by merely removing the fingers and applying torque to the first working part. The separating member of ringers are positioned in contact with the outer surface of the first working part so that a gripping or torquing tool of some sort could be used to apply torque to the stud via the first working part by gripping the outer surface of the fingers. Also, a portion of the outer working surface of the first working part remains exposed and therefore may be engaged by a tool for applying torque.

German Patent No. 2658996 to Hilti AG discloses a mechanical torque indicator for use with an anchor type member which includes a plurality of separate parts. This unit includes an elongate pin threaded at one end with a wedge member screwed onto the threaded end of the pin. The opposite end of the elongate pin is secured to a counter bearing which retains a threaded nut, and a second short threaded pin is connected at one end to the nut and at the opposite end is threaded into a torque applying nut. To permit the torque applying nut to rotate relative to the counter bearing, a slide washer is mounted on the second short pin between the two. As the torque applying nut rotates, it causes the second short pin to draw the threaded nut axially thereby drawing the elongate pin axially to cause the wedge to move axially into a casing to spread and anchor the casing. When the axial torque on the short pin exceeds a predetermined amount, the pin will break at some point releasing the washer and the torque applying nut.

The multiple parts combined with the axial torquing of the Hilti AG patented unit prevent this unit from providing an accurate control of torque. The ability of the multiple components of the unit to shift relative to one another, even slightly, can cause torque errors, but even more significant is the fact that the application of axial torque to the uniformly shaped short pin will cause the torque to spread along the length of the pin, and each pin will ultimately break at its weakest point. With no torque concentration at a weakened point of predetermined strength, accurate torque control cannot occur, nor is the breakage point controlled to prevent injury to an operator. Once breakage occurs, this patented anchor unit cannot be effectively adjusted or released, nor is it protected from unnoticeable tampering.

Thus, there is a need for a simple and effective anchor bolt assembly for providing a secure and properly torqued connection between a stud and a supporting body while also preventing subsequent unrecognized tampering with the connection.

SUMMARY OF THE PRESENT INVENTION

It is a primary object of this invention to provide an improved anchor bolt device which operates to insure a secure connection while resulting in a tamperproof assembly.

Another object of the present invention is to provide a novel and improved anchor bolt device which insures an effective and safe connection free from unauthorized tampering by preventing a gripping instrument or torquing device from effectively gripping the anchor bolt once the torque has been set.

Yet another object of the present invention is to provide a novel and improved anchor bolt device which creates a secure connection between the bolt and a supporting body by allowing only a preset torque, corresponding to that required for the effective anchoring of the bolt, to be applied to the bolt assembly, while simultaneously preventing or providing an indication of the subsequent application of torque to the anchor bolt.

These and other object of the present invention are achieved by an anchor bolt device having an elongated stud with an expandable anchoring means attached to one end. A frangible tamperproof nut assembly attached to the opposite end of the stud permits the application of a predetermined torque to the anchor bolt device for expanding the anchoring means while also protecting the outer circumferential surface of the nut assembly from subsequent tampering. The tamperproof nut assembly includes a multisided bolt head attached to a cap by a frangible connection. The cap structure is attached to one end of the stud and surrounded by a rotatably attached skirt. Once a predetermined torque has been applied to the bolt head, the frangible connection breaks leaving the anchoring means in a fully expanded position and creating a secure connection, while the skirt remains in a spaced relationship adjacent the entire outer circumferential surface of the cap structure. The outer surface of the skirt may be tapered to prevent a gripping tool from securely engaging the skirt, and the skirt may also include a lip formed on the upper circumferential edge and extending inwardly toward the frangible connection so as to prevent a gripping tool from engaging the top surface of the cap structure.

BEST MODE FOR CARRYING OUT THE INVENTION

Figure 1:
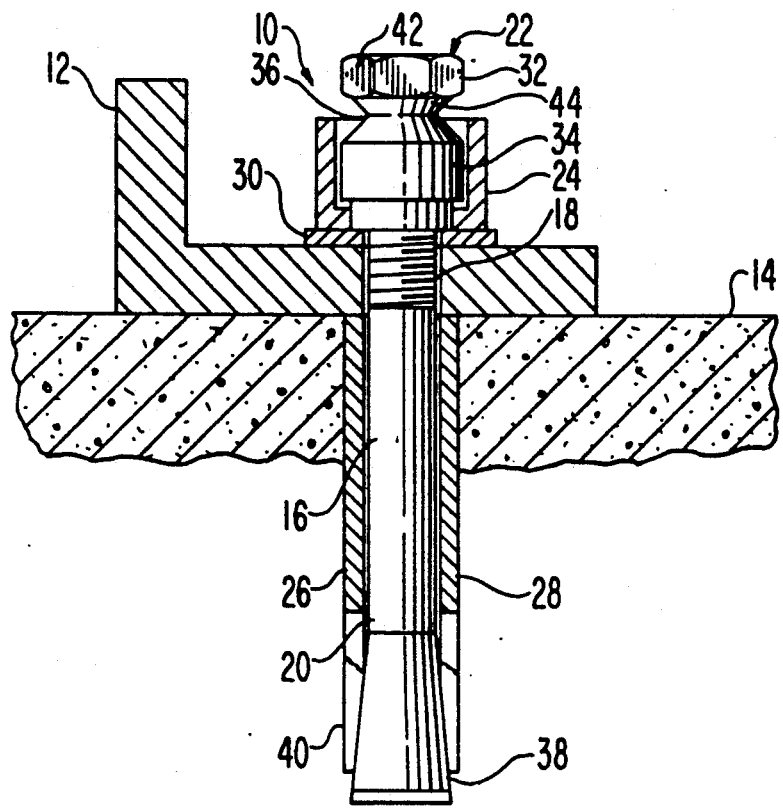
FIG. 1 is longitudinal view, partly in section, of the tamper proof anchor bolt device embodying the present invention.

Referring to FIG. 1, the tamper proof anchor bolt device of the present invention indicated generally at 10 operates to secure a first supporting body 12 to a second supporting body or receiving material 14. The first supporting body 12 may be any support structure such as beams, anchors and ceiling supports used in a variety of technical fields such as construction and mining. The second supporting body or receiving material 14 may be any relatively solid wall, such as stone, concrete, masonry construction, or other similar structures.

Figure 2:
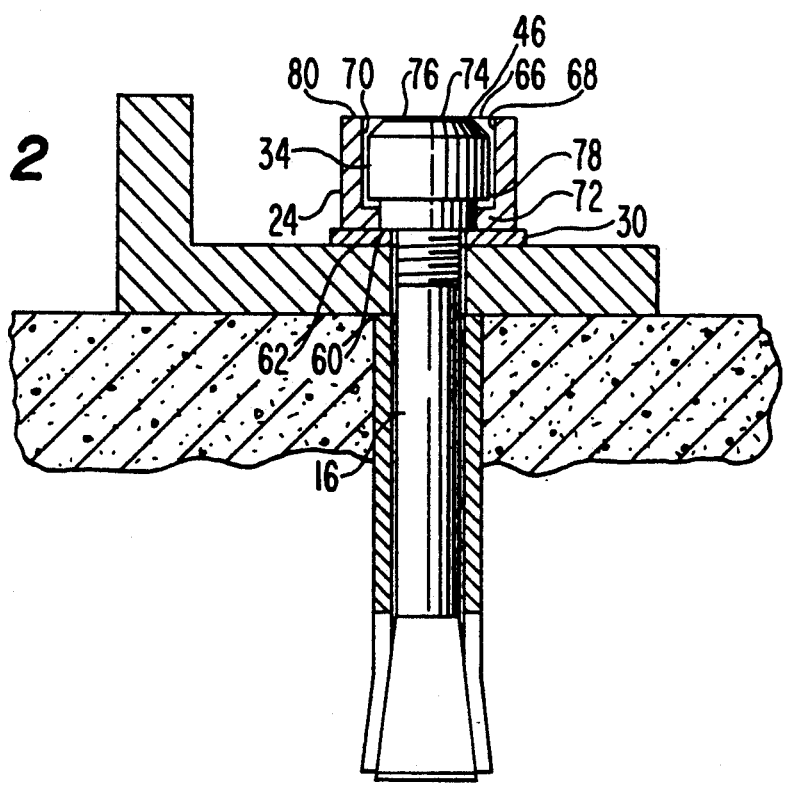
FIG. 2 is a longitudinal view, partly in section, of the tamper proof anchor bolt device of FIG. 1, but showing the frangible connection broken after the application of a predetermined torque.

The anchor bolt device 10 is shown in FIG. 1 and FIG. 2 as an expandable dowel type anchor assembly. However, the novel tamper proof anchor device may be used as a part of any commonly known mechanically expanded anchor bolt assembly having a plurality of expandable segments which extend to engage the receiving material 14. Moreover, the present invention may be applied to adhesive type anchor bolt devices which use an adhesive or resin to bond the device to the receiving material 14.

The tamper proof anchor bolt device 10 includes an elongated stud 16 having an outer threaded end portion 18 and an inner end portion 20. A frangible nut assembly 22 and a tamper resistant skirt 24 are attached to the outer end portion 18 of stud 16. An expandable anchoring sleeve 26 surrounds the inner end portion 20 as shown in FIG. 1, which illustrates the tamper proof anchor bolt device in an installed condition in a bore hole 28 formed in receiving material 14. Positioned between the juxtaposed surfaces of frangible nut assembly 22 and first supporting body 12 is a supporting disk or washer 30.

The elongated stud 16 includes a wedge section 38 integral with the inner end portion thereof. The sleeve 26 includes a plurality of expandable end segments 40 positioned adjacent and in contact with the outer surface of wedge section 38.

Figure 3:
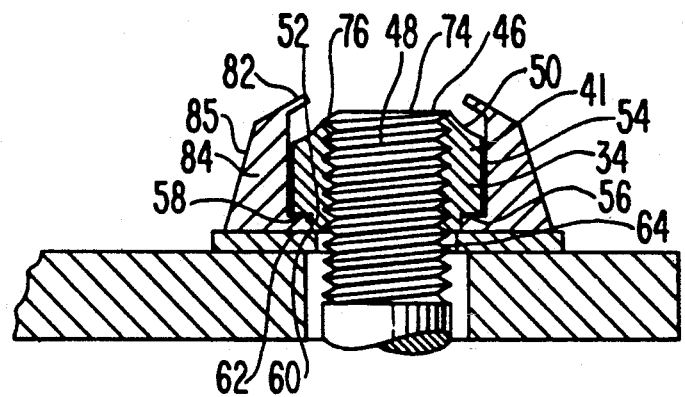
FIG. 3 is a fragmentary sectional view showing a second embodiment of a frangible nut assembly for the tamper proof anchor bolt of the present invention.
Figure 4:
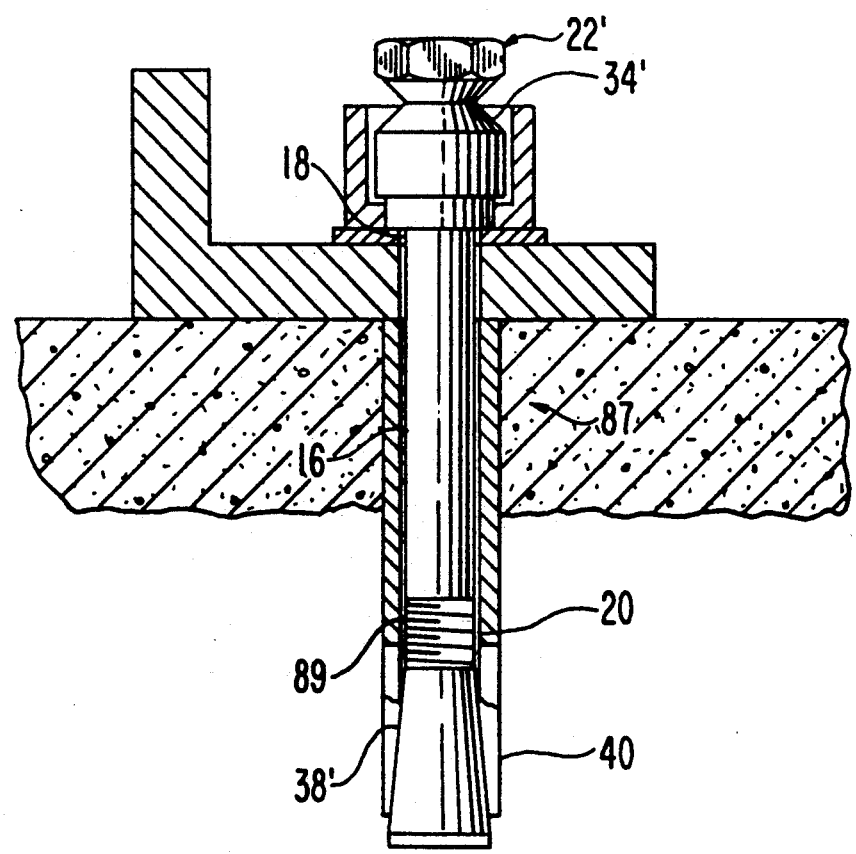
FIG. 4 is a longitudinal view, partly in section, of a second embodiment of the present invention showing a frangible nut assembly integrally attached to the anchor bolt.

Frangible nut assembly 22 includes a tool receiving nut 32 attached to a cap structure 34 by a frangible connection 36. As shown in FIG. 1, tool receiving nut 32 includes a plurality of facets 42 and a lower frustroconical shaped surface 44 formed integrally with frangible connection 36. The tool receiving nut 32 is shown as being hexagonal, but can be any other suitable shape, and is adapted to be engaged by a gripping instrument, such as a crescent wrench to turn the frangible nut assembly 22. As shown in FIGS. 1 and 3, the cap structure 34 is threadably engaged on the outer end portion 18 of stud 16. Alternatively, as shown in FIG. 4, cap 34 may be formed integrally with stud 16 at the outer end position 18 without interfering with the proper functioning of the present invention as further explained below. The cap 34 has a section 41 with an outer peripheral surface 54 which is essentially cylindrical in shape (FIG. 3), and includes a central threaded bore 46 having threads which are designed to engage with threads 48 on the stud 16. The cap 34 fits coaxially onto the stud 16 and has a frustroconically shaped top surface 50 angling upwardly away from the cylindrically shaped section 41. This top surface 50 is integral with the inverted conical surface 44 formed on nut 32 to form the frangible connection 36. Top surface 50 also has a bottom edge 52 from which depends the outer peripheral surface 54. A shoulder or ledge 58 extends radially inward from the lower extremity of the peripheral surface 54 of section 41 to form a counterbore 60 having an inner wall 62. Cap structure 34 also includes a bearing surface 64 extending inwardly from the lowermost extent of wall 62 which is adapted to be compressed against the upper surface of washer 30.

The frangible connection 36 is formed by a reduced thickness of metal adapted to shear apart or rupture upon the application of a predetermined amount of torque between the tool receiving nut 32 and the cap 34. The torque at which the frangible connection 36 ruptures is chosen to correspond to the torque required for the optimum connection between the anchoring sleeve 26 and the receiving material 14. The optimum anchoring characteristics of any tamper proof anchor bolt device are achieved by applying only the required torque necessary to expand the anchoring sleeve 26, or other expandable anchoring means, into engagement with the receiving material 14 until a secure connection is achieved, without the application of force sufficient to rupture the receiving material or destroy the anchoring means. The application of a precise predetermined torque corresponding to the optimum expansion of the anchoring means or sleeve 26 is achieved by choosing a frangible nut assembly having a frangible connection 36 which will rupture at the predetermined torque calculated for the particular application. The predetermined torque value for a particular application may be calculated based upon the hardness and compressibility of the receiving material 14 and the amount of force needed between the segments 40 and the receiving material 14 to effectively support body 12.

The frangible nut assembly 22 can be color-coded to correspond to a specific torque value for a particular anchoring device or application. Thus, in instances where the nut assembly is not integral with the stud 16, nut assemblies capable of providing different torques may be selected and threaded onto the stud.

As shown in FIGS. 2 and 3, tamper resistant skirt 24 is essentially cylindrical in shape and includes an inner face 68 defining a central bore 66 for receiving cap 34. The inner diameter of skirt 24 exceeds the outer diameter of cap 34 to form a gap 70. Gap 70 enables the skirt 24 to rotate freely about cap 34 to prevent a gripping tool from engaging, and hence gripping, cap 34. The skirt 24 has an axial movement preventing means thereon comprised of a flange 72 on the lower end thereof for slipping on the top surface of washer 30. The flange 72 prevents movement of skirt 24 axially of the stud 16, and thus prevents removal of the skirt 24 from cap 34. Preferably, the cap 34 is of a sufficient length so that the terminal end 74 of stud 16 lies coplanar with rim 76 formed after nut 32 has been sheared away, as best shown in FIG. 3. Thus, the cap 34 cannot be gripped from inside bore 46. The flange 72 has an upper face 78 adapted to engage ledge 58 and has a thickness slightly less than the length of counter bore 60 to permit skirt 24 to rotate freely. Skirt 24 will be formed of a material having sufficient strength so that the skirt cannot be crushed against cap 34 sufficiently to allow the cap 34 to be turned through frictional engagement with the inner face 68 of skirt 24. Furthermore, the gap 70 is large enough to allow the free rotation of skirt 24 about cap 34, but small enough to prevent a jamming device, or even an adhesive, to be introduced into gap 70 so that skirt 24 and cap 34 can be rotated together.

The top edge 80 of skirt 24 extends above rim 76. Thus, top surface 50 of cap 34 is surrounded by skirt 24 to prevent engagement by a gripping tool. The sloping nature of surface 50 also prevents the grasping of cap 34 by any instrument with enough force to enable separation of the cap 34 from the stud 16.

An alternative embodiment to skirt 34 is shown in FIG. 3 and includes a skirt 84 terminating at an inturned lip or ledge 82 formed on the upper peripheral edge of the skirt and extending inwardly toward rim 76 of cap 34. Lip 82 may be formed prior to the application of the torque and the shearing of nut 32, such as in the manufacturing of the frangible nut assembly 22, thereby creating a unitary tamper resistant skirt and frangible nut assembly. Alternatively, lip 82 may be swaged around the upper edge of the skirt after the predetermined torque has been applied. Lip 82 functions to protect rim 76 from engagement by a gripping instrument since a portion of frangible connection 36 may extend upwardly from rim 78 after nut 32 has been removed. Lip 82 also functions to shield personnel from contact with rim 76 which may have jagged edges after nut 32 has been separated. The outer tapered surface 85 of skirt 84 functions to prevent a gripping tool from grasping the skirt 84 with sufficient force to deform the skirt into frictional engagement with surface 54 of cap 34.

The structure of the anchor bolt device 87 of FIG. 4 is substantially the same as that of the anchor bolt device 10 of FIGS. 1, 2, or 3, with the exception that the threads 18 are eliminated and the cap structure 34 of the frangible nut assembly 22 is formed integrally with the uppermost end of the stud 16 to provide a unitary structure. The cap structure may be secured to the stud by brazing, welding, or other known methods.

In the anchor bolt device of FIG. 4, the lower end of the stud 16 is threaded at 89, and the wedge section 38 is internally threaded and is screwed onto the threaded end of the stud 16. When the frangible nut assembly 22 is rotated, the entire stud 16 will rotate so that the threads 89 will draw the wedge section 38 into the sleeve 26.

Figure 5:
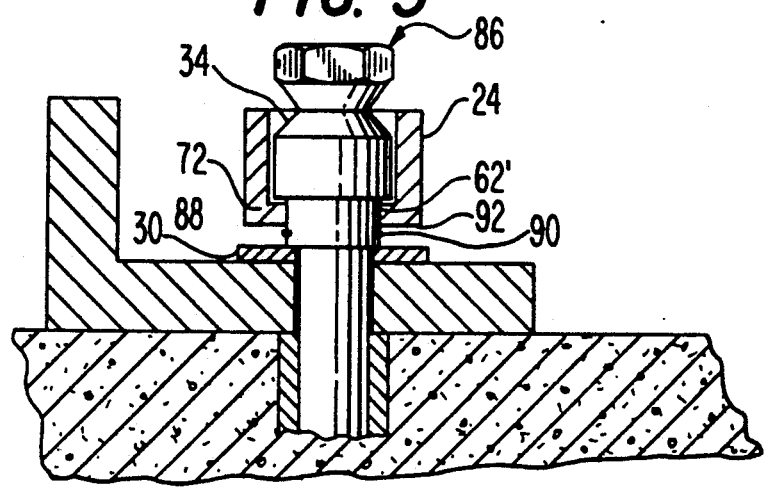
FIG. 5 is a partial sectional view showing a structure for securing a protective skirt to the frangible nut assembly for the tamper proof anchor bolt of the present invention.
Figure 6:
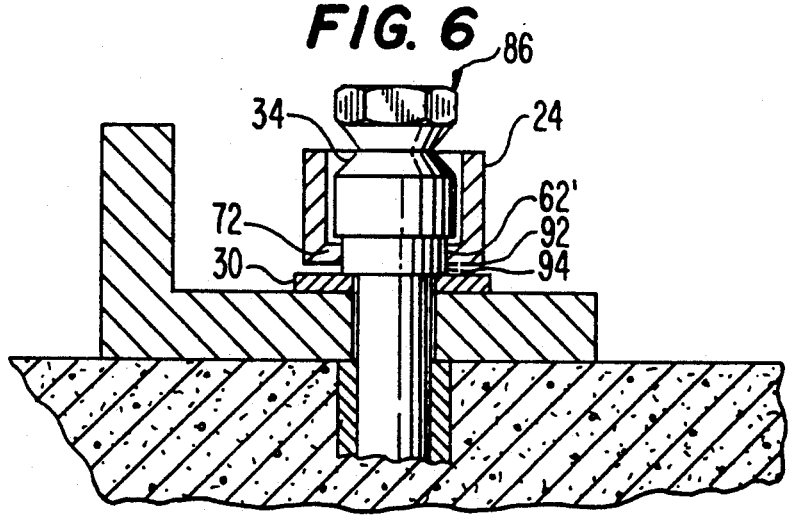
FIG. 6 is a partial sectional view showing a second embodiment of a structure for securing a protective skirt to the frangible nut assembly for the tamper proof anchor bolt of the present invention.

Referring to FIGS. 5 and 6, frangible nut assembly 86 is substantially the same as nut assembly 22, but includes a means for securing skirt 24 to assembly 86 to provide a unitary assembly for easier shipping, handling, and installation. As shown in FIG. 5, inner wall 62' of cap 34 extends below flange 72 of skirt 24 and includes a groove 88 for receiving snap ring 90. Alternatively, as shown in FIG. 6, the securing means may comprise one or more distortions or protrusions 94 formed on the outer peripheral surface of wall 62'. In either case, the wall 62' only extends below flange 72 a sufficient distance to permit the effective formation of groove 88 or protrusions 94, while minimizing the gap formed between the lower surface 92 of flange 72 and washer 30 to prevent the insertion of an instrument or tool into the gap for engaging wall 62' of cap 34. Another alternative may be to install a temporary plastic ring around either the wall 62' (FIG. 5) or the outer portion 18 of the stud 16 adjacent the lower edge of cap 34' (FIG. 4). The internal diameter of the plastic ring could be slightly smaller than the diameter of outer portion 18 so as to frictionally engage outer portion 18 while permitting removal of the ring before using the assembly.

The tamper anchor bolt device 10 is assembled for use by inserting stud 16 with sleeve 26 in place into bore hole 28 so that outer end portion 18 extends from receiving material 14 through body 12 and washer 30. Tamper resistant skirt 24 is placed over outer end portion 18 so that flange 72 abuts washer 30. Frangible nut assembly 22 is then inserted into central bore 66 of skirt 24 and threaded onto outer end portion 18. A gripping instrument or tool is then used to grip and rotate nut 32 and cap 34. This rotation causes stud 16 to move linearly upward through bore hole 28 and further into bore 46 of cap 34 while sleeve 26 remains in stationery abutment with body 12. As stud 16 moves upwardly, wedge section 38 is forced against expandable segments 40 causing segments 40 to expand outwardly into engagement with material 14. Therefore, the amount of expansion of segments 40 is related to the degree of rotation or the amount of torque applied to nut 32. When the predetermined torque is reached, further rotation of nut 32 will cause frangible connection 36 to shear, thereby separating nut 32 from cap 34. Once nut 32 is separated from cap 34, as shown in FIG. 2, skirt 24 (84) is automatically positioned around the entire outer surface 54 and top surface 50 of cap 34.

It should be noted that a frangible nut assembly 22 may be used with a variety of existing anchor bolt assemblies having segments which expand outwardly in response to the rotation of the nut assembly 22 connected therewith. For instance, as shown in FIG. 4, a frangible nut assembly 22' may be formed integrally on the outer end portion 18 of stud 16 while a wedge portion 38' is threadably engaged on inner end portion 20 of stud 16 so that rotation of assembly 22' and, consequently, stud 16 causes wedge portion 38' to move linearly toward assembly 22' and into engagement with segments 40.

Figure 7:
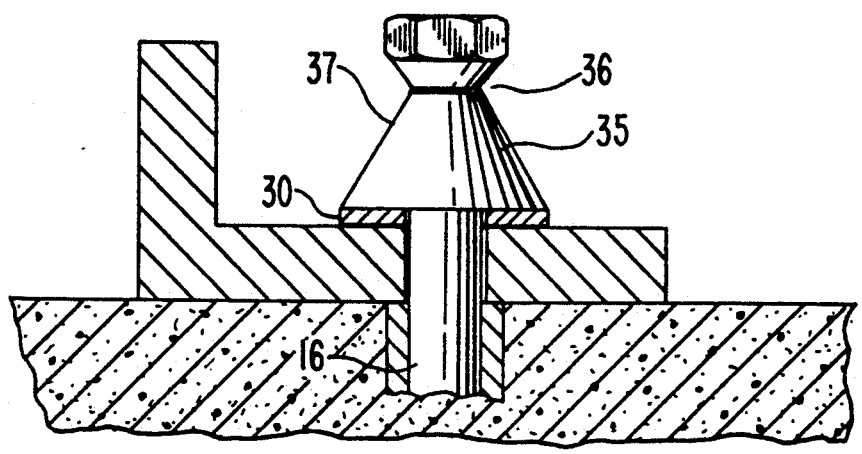
FIG. 7 is a partial longitudinal view, partly in section, of a third embodiment of the present invention.

As shown in FIG. 7, where cap 35 of the frangible nut assembly is formed integrally with stud 16, the cap 35 may be provided with an outer surface 37 tapered along substantially the entire axial length of the cap 35. This tapered outer surface 37 prevents a tool from gripping cap 35 with enough force to disturb the applied torque, and the skirt 24 can be omitted.

Figure 8:
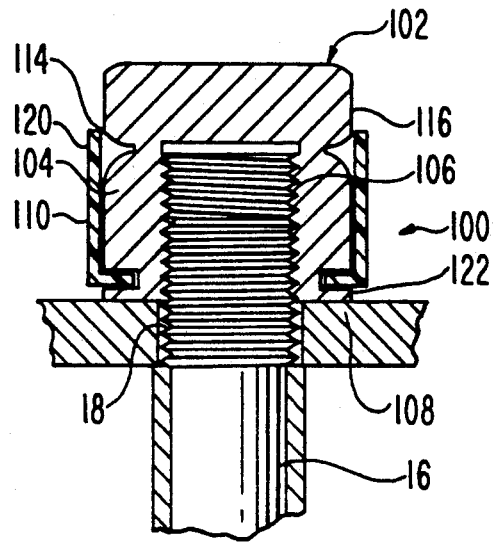
FIG. 8 is a partial longitudinal view, partly in section, of a fourth embodiment of the present invention.
Figure 9:
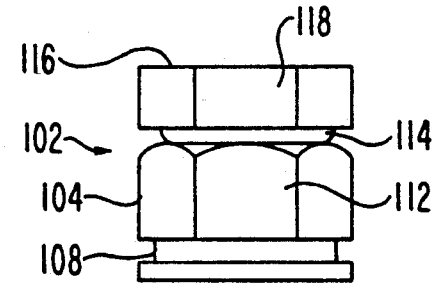
FIG. 9 is a front elevational view of the frangible nut assembly for the tamper proof anchor bolt device of FIG. 8.
Figure 10:
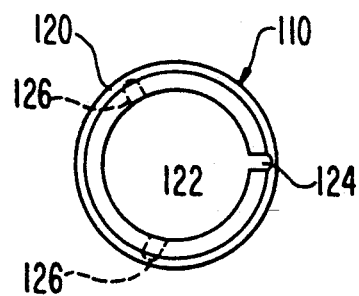
FIG. 10 is a plan view of a protective skirt for the tamper proof anchor bolt device of FIG. 8.

Referring now to FIGS. 8-10, a modified tamper proof anchor bolt device 100 is illustrated for use with the elongated stud 16 and integral wedge section 38 of FIG. 1. This device includes a frangible nut assembly 102 having a lower, shield mounting nut 104 formed with an internally threaded bore at 106 to mate with the threads on the end 18 of the elongated stud 16. The lower end of the shield mounting nut is provided with a mounting groove 108 extending around the shield mounting nut to receive and and mount a tamper indicating skirt or shield 110. Above the mounting groove, the shield mounting nut is provided with a plurality of facets 112 adapted to be engaged by a gripping instrument, such as a wrench.

Connected to the shield mounting nut 104 by a frangible connection 114 is a second tool receiving nut 116. Tool receiving nut 116 is similar to tool receiving nut 32 and includes a plurality of tool engaging facets 118. Both the tool receiving nuts 32 and 102 may be solid, as shown in FIG. 8, or may include an unthreaded central opening which extends through to the bores 46 and 106. When a solid tool receiving nut, or one with a central passage which is of less diameter than that of the bores 46 and 106, is used, the end of the stud 16 will be prevented from protruding an unacceptable distance above the cap 14 or the shield mounting nuts 104. Normally, the tamper proof anchor bolt device is designed so that the tool receiving nut 32 and 116 will shear from the cap 34 or shield mounting nut 104 in response to torque when the end of the stud 16 is substantially even with the top of the cap or shield mounting nut. However, if a malfunction occurs, the stud will be engaged by the tool receiving nut to indicate that a new frangible nut assembly should be employed.

The torque applied to the tool receiving nut 116 is, in the same manner as previously disclosed for the frangible connection 36 of the tamper proof anchor bolt 10, all directed to the frangible connection 114 between the tool receiving nut and the shield mounting nut. In both cases, this is primarily rotational torque, for the longitudinal stress on the stud 16 is not transmitted to the frangible connection. Thus, the frangible connection can be formed to shear at a specific torque value to very accurately set the anchor bolt device in the supporting body.

The tamper indicating skirt 110, unlike the skirt 24, is not formed of solid metal which cannot be crushed. Instead, the skirt 110 is formed of an ungluable plastic bearing material such as polyamides, Teflon or the like. The skirt includes a sidewall 120 which extends around the skirt mounting nut 104 and preferably slightly above the frangible connection 114. At the bottom of the sidewall 120 is an inwardly extending flange 122 which seats in the mounting groove 108.

At least one tear slot 124 extends through the flange 122 and in some instances, upwardly along the interior of the sidewall 120. If desirable, several of these tear slots may be spaced around the interior of the skirt 110, as indicated at 126 by broken lines. If someone attempts to tamper with the tamper proof anchor bolt device 100 by inserting a tool between the sidewall 120 of the skirt 110 and the shield mounting nut 104, the stress will cause a tear slot to rupture and provide evidence of tampering.

The mounting groove 108 is dimensioned relative to the flange 122 to permit the skirt 110 to freely rotate around the mounting nut 104. Even if gripped, the bearing characteristic of the material forming the sidewall 120 will permit the sidewall to rotate easily over the mounting nut 104, and a grip sufficient to cause rotation of the mounting nut will be difficult to attain. If the exterior of the skirt 110 is gripped sufficiently to turn the mounting nut 104, the stress will cause the skirt to permanently deform and/or rupture. In most cases, the skirt will rupture along a tear slot.

Figure 11:
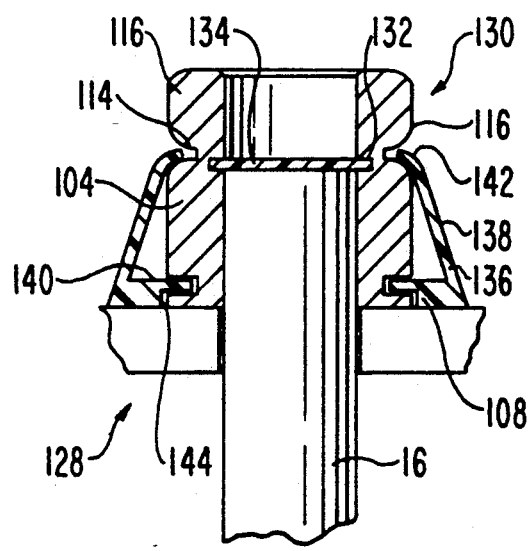
FIG. 11 is a partial longitudinal view, partly in section, of a fifth embodiment of the present invention.

FIG. 11 illustrates a tamper proof anchor bolt device 128 which is similar to the device 100 in most respects. Here, as in FIG. 4, the frangible nut assembly 130 is secured directly to the upper end of the elongated stud 16 to provide a unitary unit. Thus the lower end of the stud is threaded into the wedge section 38.

The frangible nut assembly 130 is essentially the same as the frangible nut assembly 102, and the same reference numerals are sued for like components. The skirt mounting nut 104 includes a central bore which is not threaded, but instead the mounting nut is bonded to the elongated stud 16. An internal groove 132 may be cut in the bore of the mounting nut below the frangible connection 114, and a frangible plastic disc 134 is mounted in this groove. The disc 134 will shatter if someone attempts to apply pressure to the disc sufficient to turn the shield mounting nut 104 and stud 16. Otherwise, the disc will rotate in the groove 132.

A tamper indicating skirt 136 is mounted over the skirt mounting nut 104, and like the skirt 110, is formed of a nongluable plastic bearing material. Here, the outer wall 138 of the tamper indicating skirt tapers along its length from a bottom flange 140 to render the skirt difficult to grip. At its uppermost edge, the skirt sidewall 138 has an inwardly projecting flange 142 that extends between the tool engaging nut 116 and the skirt mounting nut 104. When the tool engaging nut shears away, this flange 142 makes it more difficult to insert a tool between the sidewall 138 and the skirt mounting nut 104.

The skirt 136 is mounted for free rotation in the mounting groove 108. In most instances, it is not possible without rupturing the skirt, to inset a gripping tool under the skirt to grip the skirt mounting nut 104 below the mounting groove 108. However, to insure that this does not occur, the bottom flange 140 includes a cutaway portion 144 to receive the portion of the mounting nut which extends below the mounting groove 108. Thus, the lower portion of the mounting nut is completely covered by the skirt 136.

The skirt 136 is provided with tear slots 124 and 126 in the same manner illustrated in FIG. 10. These tear slots extend through the flange 140 and into the sidewall 138. The structure of FIGS. 8 and 11 is very beneficial for some applications, as once the tamper proof anchor bolt device has been set, it may later be removed or adjusted by removing the skirts 110 or 136 to expose the mounting nut 104. This nut may then be engaged with a wrench or other tool to remove or adjust the device, but the fact that this has occurred is clearly indicated.

The tamper proof anchor bolt device of this invention operates effectively in response to a specific predetermined rotational torque, as the device does not include a plurality of separate components and connections which can shift to vary the torque at which the device operates. All rotational torque is directed to a specific frangible connection so that the devise shears at the same predetermined point. This frangible connection is not subjected to the longitudinal stresses which result from the elongated stud 16, for it is substantially isolated from these stresses by the support engaging cap 34 or the skirt mounting nut 104. Thus it responds primarily to rotational torque from the tool receiving nuts 22 and 116.

I claim:
1. A tamper proof anchor bolt device for engaging a supporting body comprising:
    an elongated stud having a first and a second end portion, and a longitudinal axis extending therebetween;
    a torque transmitting means associated with said first end portion of said stud and operative to transmit torque to said stud, said torque transmitting means including a unitary body which includes a stud engaging means connected to said stud, a tool receiving means for receiving a torque applying tool and a torque limiting means, said torque limiting means operating to prevent the application of additional torque beyond a predetermined torque to said stud by said torque transmitting means and to concentrate the torque applied to said tool receiving means in a limited area of reduced cross section between said tool receiving means and said stud engaging means, and
    a temper prevention means including a skirt circumscribing and rotatably attached to the stud engaging means of said torque transmitting means for preventing a gripping tool from applying a gripping force to said torque transmitting means after the application of said predetermined torque without providing an indication of tampering, said skirt including a sidewall having a lower edge and an upper edge, the lower edge being positioned adjacent to the juncture between elongate stud and said stud engaging means and said upper edge being positioned to extend upwardly and inwardly over said limited area of reduced cross section, and an inwardly extending flange means formed at the lower edge of said skirt, said stud engaging means being provided with a circumferential mounting groove to receive and retain said inwardly extending flange means.

2. The tamper proof anchor bolt device of claim 1 wherein said skirt includes at least one radial tear slot formed in said inwardly extending flange means.

3. The tamper proof anchor bolt device of claim 1 wherein said skirt includes at least one weakening groove formed in said sidewall and extending inwardly from the surface of said sidewall which is adjacent to said stud engaging means, said weakening groove extending from said radial slot upwardly toward the upper edge of said sidewall.

4. The tamper proof anchor bolt device of claim 3 wherein said skirt is formed of plastic material.

5. The tamper proof anchor bolt device of claim 4 wherein said stud engaging means and said tool receiving means are formed to be engaged and rotated by a torque applying tool.

6. The tamper proof anchor bolt device of claim 5 wherein said stud engaging means operates to engage a supporting body and substantially isolate the limited area between said stud engaging means and said tool receiving means from forces developed in the direction of the longitudinal axis of said stud.

7. The tamper proof anchor bolt device of claim 6 which includes an anchoring means at the second end portion of said stud and operative to create a secure connection between said stud and a supporting body, said secure connection being obtained by the application of the predetermined torque to said torque transmitting means, said anchoring means including an expandable engaging means for creating said secure connection by expanding outwardly relative to the longitudinal axis of said elongated stud to engage the supporting body, and wedge means mounted on the second end portion of said stud and movable by said stud in the direction of the longitudinal axis thereof to expand said expandable engaging means.

8. The tamper proof anchor bolt device of claim 7 wherein the first end portion of said stud is threaded, said stub engaging means including a threaded bore which is engaged with the threads on the first end portion of said stud, said unitary body of said torque transmitting means being rotatable relative to the first end portion of said stud in response to torque applied to said tool receiving means to move said stud longitudinally by moving said first end portion thereof in said threaded bore, said wedge means being nonrotatably attached to the second end portion of said stud.

9. The tamper proof anchor bolt device of claim 7 wherein said stud engaging means is integrally attached to the first end portion of said stud so as to be nonrotatable relative to said stud, said unitary body of said torque transmitting means and said stud being rotatable in response to torque applied to said torque receiving means, and the second end portion of said stud being threaded, said wedge means including a threaded bore which is engaged with the threads on the second end portion of said stud, said torque transmitting means and elongated stud being rotatable relative to said wedge means in response to torque applied to said tool receiving means to move said wedge means along the longitudinal axis of said stud by moving the second end portion thereof relative to said threaded bore.

10. The tamper proof anchor bolt device of claim 1 wherein said skirt is formed of plastic material.

11. The tamper proof anchor bolt device of claim 1 wherein said stud engaging means and said tool receiving means are both formed to be engaged and rotated by a torque applying tool.

12. The tamper proof anchor bolt device of claim 1 wherein said stud engaging means operates to engage a supporting body and substantially isolate the limited area between said stud engaging means and said tool receiving means from forces developed in the direction of the longitudinal axis of said stud.

13. The tamper proof anchor bolt device of claim 1 which includes an anchoring means at the second end of said stud and operative to create a secure connection between said stud and a supporting body, said secure connection being obtained by the application of the predetermined torque to said torque transmitting means, said anchoring means including an expandable engaging means for creating said secure connection by expanding outwardly relative to the longitudinal axis of said elongated stud to engage the supporting body, and wedge means mounted on the second end portion of said stud and movable by said stud in the direction of the longitudinal axis thereof to expand said expandable engaging means.

14. The tamper proof anchor bolt device of claim 13 wherein the first end portion of said stud is threaded, said stud engaging means including a threaded bore which is engaged with the threads on the first end portion of said stud, said unitary body of said torque transmitting means being rotatable relative to the first end portion of said stud in response to torque applied to said tool receiving means to move said stud longitudinally by moving said first end portion thereof in said threaded bore, said wedge means being nonrotatably attached to the second end portion of said stud.

15. The tamper proof anchor bolt device of claim 13 wherein stud engaging means is integrally attached to the first end portion of said stud so as to be nonrotatable relative to said stud, said unitary body of said torque transmitting means and said stud being rotatable in response to torque applied to said torque receiving means, and the second end portion of said stud being threaded, said wedge means including a threaded bore which is engaged with the threads on the second end portion of said stud, said torque transmitting means and elongated stud being rotatable relative to said wedge means in response to torque applied to said tool receiving means to move said wedge means along the a longitudinal axis of said stud by moving the second end portion thereof relative to said threaded bore.

16. The tamper proof anchor bolt device of claim 1 wherein the sidewall of said skirt is tampered from said lower edge to said upper edge so as to angle inwardly toward said stud engaging means from said lower edged along the sidewall to said upper edge.

17. The tamper proof anchor bolt device of claim 1 wherein the cross sectional area of said stud engaging means is reduced to form a reduced section thereof adjacent to said stud to provide a radially extending wall defining one extent of said reduced section, a groove is formed in said reduced section in spaced relation to said radially extending wall and a removable snap ring is mounted in said groove, said snap ring and radially extending wall defining said circumferential mounting groove.

* * * * *